United States Patent
Yeh et al.

(10) Patent No.: US 7,167,221 B2
(45) Date of Patent: Jan. 23, 2007

(54) LIQUID CRYSTAL DISPLAY DEVICE

(75) Inventors: Sheng-Shiou Yeh, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 89 days.

(21) Appl. No.: 10/831,685

(22) Filed: Apr. 23, 2004

(65) Prior Publication Data

US 2004/0212762 A1 Oct. 28, 2004

(30) Foreign Application Priority Data

Apr. 23, 2003 (TW) ................................ 92109511 A

(51) Int. Cl.
*G02F 1/1337* (2006.01)

(52) U.S. Cl. ........................ 349/110; 349/111; 349/106; 349/155

(58) Field of Classification Search ................ 349/106, 349/110, 111, 155
See application file for complete search history.

(56) References Cited

U.S. PATENT DOCUMENTS

| | | | | |
|---|---|---|---|---|
| 5,592,317 A | * | 1/1997 | Fujikawa et al. ........... 349/110 |
| 6,128,057 A | * | 10/2000 | Suzuki et al. ............... 349/110 |
| 6,285,424 B1 | * | 9/2001 | Yoshida ....................... 349/110 |
| 6,740,457 B2 | * | 5/2004 | Takizawa ........................ 430/7 |
| 2001/0017677 A1 | * | 8/2001 | Kishimoto et al. ......... 349/106 |
| 2003/0103181 A1 | * | 6/2003 | Imayama et al. ........... 349/122 |
| 2003/0118922 A1 | * | 6/2003 | Hayashi et al. ................ 430/7 |
| 2003/0128311 A1 | * | 7/2003 | Tsuda et al. ................ 349/106 |

* cited by examiner

*Primary Examiner*—David Nelms
*Assistant Examiner*—(Nancy) Thanh-Nhan Phan Nguyen
(74) *Attorney, Agent, or Firm*—Wei Te Chung

(57) ABSTRACT

A color filter (30) includes a black matrix (33), and the black matrix has a first antireflection layer (331) and a second antireflection layer (332) on the first antireflection layer. Each antireflection layer includes a first antireflection film (3311, 3321) having a first refraction index, and a second antireflection film (3312, 3322) having a second refraction index which is different to the first refraction index. Because of so-called destructive interference of outside source light beams reflected from various interfaces defined by the first and second antireflection films, net reflection of the light beams by the black matrix back to an outside of the color filter is minimal. For similar reasons, net reflection of internal source light beams by the black matrix back to an inside of the color filter is minimal. As a result, visibility of a liquid crystal display device (300) employing the color filter is improved.

6 Claims, 4 Drawing Sheets

LIQUID CRYSTAL DISPLAY DEVICE

BACKGROUND OF THE INVENTION

1. Field of the Invention

The invention generally relates to color filters having black matrixes, and to associated liquid crystal display (LCD) devices.

2. The Prior Art

In general, a monochrome or a color LCD device has the advantages of thinness, light weight and low power consumption. For this reason, LCD devices are widely used in various types of electronic equipment, from pocket calculators to large-scale office automation equipment.

Conventionally, a color LCD device includes a color filter at a position opposite to a liquid crystal layer. The color filter has three kinds of color (red, green and blue—RGB) resins separated by a black matrix having a plurality of apertures. The visibility of the LCD device mainly depends upon the characteristics of the black matrix of the color filter.

The basic structure of a conventional color LCD device is shown in FIG. 8. The LCD device 100 includes two glass substrates 14, 17 which cooperatively defining a chamber therebetween for receiving a liquid crystal layer 15. A plurality of columnar spacers 18 is distributed in the chamber for supporting of the two glass substrates 14, 17. The substrate 14, a color resin layer 12, a black matrix 13 and an ITO (Indium Tin Oxide) layer 11 collectively constitute a color filter. The color resin layer 12 includes RGB color resins respectively filled in apertures of the black matrix 13. The RGB color resins filter light beams passing therethrough, thus producing RGB color light beams.

The black matrix 13 functions as a light-shielding mask, to improve the contrast ratio of an LCD device using the color filter. In particular, a black matrix having an increased OD (Optical Density, i.e. light-shielding) value and having reduced optical reflectivity of top and bottom surfaces thereof is desired. However, the black matrix 13 is conventionally made from a metal whose optical reflectivity is too high, or is made from a resin whose OD value is too low. Thus, modified color filters have been developed to solve the above-described problems.

Referring to FIG. 9, a color filter as described in U.S. Pat. No. 6,285,424 issued on Sep. 4, 2001 is illustrated. The color filter 20 comprises a black matrix 23 formed on a transparent substrate 24. The black matrix 23 comprises a first antireflection film 231, a second antireflection film 232 and a metal screening film 233, formed one on top of the other in that order. The antireflection films 231, 232 are made of different kinds of metallic compounds having mutually different compositions. At least one of the films 231, 232, 233 contains chromium (Cr). In addition, RGB color resins 22 are separately filled in apertures of the black matrix 23. A protective layer 25 and a conductive layer 21 are sequentially formed on the RGB color resins 22 and the black matrix 23. The protective layer 25 functions as a layer flattening the color filter 20, and as an insulator.

In manufacturing of the color filter 20, firstly, the black matrix 23 having a plurality of apertures is formed on the transparent substrate 24 using exposing and developing technology. Then the RGB color resins 22 are repeatedly and respectively filled in the apertures of the black matrix 23, so that every three adjacent apertures have three different color resins and cooperatively define a pixel. Then the protective layer 25 is formed on the RGB color resins 22 and the black matrix 23, to provide an even outer surface for the color filter 20.

The multi-layer antireflection structure of the black matrix 23 can decrease the optical reflectivity of the surface thereof adjacent the transparent substrate 24. However, the optical reflectivity of the other surface thereof opposite to the transparent substrate 24 is still generally too great. That is, the optical reflectivity of the outer surface of the metal screening film 233 is too great. When the black matrix 23 is used in an LCD device, back light beams are reflected by the outer surface of the metal screening film 233 to an excessive degree. This creates light interference, which reduces the visibility of the LCD device. In addition, the multi-layer antireflection structure of the black matrix 23 only has two antireflection films 231, 232, giving the black matrix 23 insufficient ability to suppress reflections occurring on the surface thereof adjacent the transparent substrate 24.

Therefore, it is desired to obtain a color filter with low reflectivity on both surfaces thereof, and to obtain an LCD device incorporating such color filter.

SUMMARY OF THE INVENTION

A main object of the present invention is to provide a color filter with low reflectivity on both of main surfaces thereof.

A color filter in accordance with the present invention comprises a substrate, a black matrix, and a color resin layer. The black matrix has a plurality of apertures defined adjacent the substrate, and comprises a first layer on the substrate and a second layer on the first layer. The first and second layers each include a first antireflection film having a first refraction index, and a second antireflection film formed on the first antireflection film and having a second refraction index which is greater than the first refraction index. The color resin layer is filled in the apertures of the black matrix, and covers the black matrix entirely.

Because of so-called destructive interference of outside source light beams reflected from various interfaces defined by the first and second antireflection films, net reflection of the light beams by the black matrix back to an outside of the color filter is minimal. For similar reasons, net reflection of internal source light beams by the black matrix back to an inside of the color filter is minimal. In summary, the color filter features reduced optical reflection at both main surfaces thereof, and reduced wavelength dependence of the reflection in the visible wavelength range. As a result, visibility of a liquid crystal display device employing the color filter is improved.

Other objects, advantages, and novel features of the present invention will become more apparent from the following detailed description when taken in conjunction with the accompanying drawings, in which:

DESCRIPTION OF THE PREFERRED EMBODIMENTS

Figure 1:
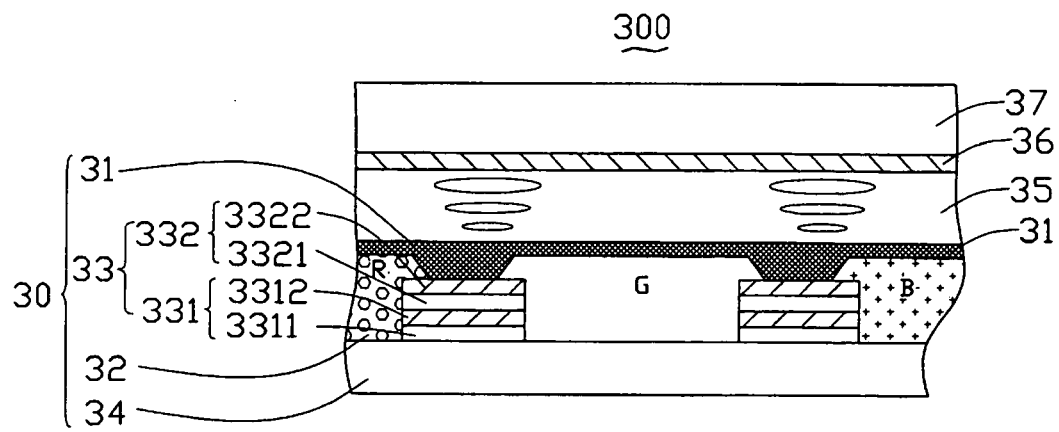
FIG. 1 is a schematic, cross-sectional view of part of a first embodiment of an LCD device according to the present invention.

Referring to FIG. 1, an LCD device 300 in accordance with the first embodiment of the present invention is illustrated. The LCD device 300 includes a substrate-like color filter 30 and an opposing electrode substrate 37. The two substrates 30, 37 form a chamber therebetween filled with a liquid crystal layer 35.

The color filter 30 includes a transparent substrate 34, and a color resin layer 32 and a black matrix 33 formed on the transparent substrate 34. The black matrix 33 defines a plurality of apertures (not labeled) arranged in an array, the apertures being filled with the color resin layer 32 thus forming a plurality of color cells. In addition, an ITO layer 31 is formed on the color resin layer 32 and the black matrix 33. A TFT (Thin Film Transistor) layer 36 is formed on an inner surface (not labeled) of the electrode substrate 37.

Figure 2:
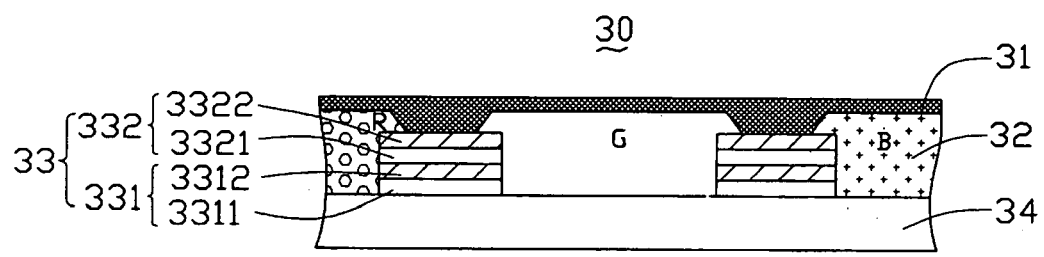
FIG. 2 is a schematic, cross-sectional view of part of a color filter used in the LCD device of FIG. 1.

Referring to FIG 2, the black matrix 33 comprises two laminated antireflection layers 331, 332 formed on the transparent substrate 34. The antireflection layer 331 includes a first antireflection film 3311 and a laminated second antireflection film 3312. The antireflection layer 332 includes a first antireflection film 3321 and a laminated second antireflection film 3322. The first antireflection films 3311, 3321 each have a first index of refraction, and each have a thickness in the range from 20 to 60 mm The second antireflection films 3312, 3322 each have a second index of refraction, and each have a thickness in the range from 20 to 100 nm. The first and second indexes of refraction are different. Preferably, the first refraction index is less than the second refraction index. Further, the first antireflection films 3311, 3321 are preferably made mainly from chromium oxide ($CrO_x$, X denoting the ratio of the number of atoms of O to the number of atoms of Cr), whereas the second antireflection films 3312, 3322 are preferably made mainly from chromium nitride ($CrN_y$, Y denoting the ratio of the number of atoms of N to the number of atoms of Cr).

The color resin layer 32 includes three kinds of color resins; i.e., RGB (Red, Green, Blue) resins. Each three contiguous apertures of the black matrix 33 are filled with the RGB resins sequentially to form a pixel.

In operation, the TFT and ITO layers 36, 31 are connected with an IC (Integrated Circuit) device (not shown), in order to control rotation of liquid crystal molecules in the liquid crystal layer 35 and thereby control the passage or blocking of light beams. Back light beams emitted by an illuminator (not shown) pass through the electrode substrate 37 and the TFT layer 36, and enter the liquid crystal layer 35. Most of the light beams pass through the liquid crystal layer 35, are filtered by the color resin layer 32 of the color filter 30, and emit from an outer surface (not labeled) of the transparent substrate 34. A remainder of the light beams pass through the liquid crystal layer 35, but are blocked by the black matrix 33.

When light beams from an outside source pass through the transparent substrate 34 and are incident on any given portion of the black matrix 33, most of the light beams enter the first antireflection films 3311 of the antireflection layer 331, a first reflected portion of the light beams is reflected back into the transparent substrate 34 by a first interface defined between the transparent substrate 34 and the first antireflection film 3311, and another portion of the light beams is lost at the first interfaces. The light beams which enter the first antireflection film 3311 pass therethrough and are incident on the second antireflection film 3312. Most of the light beams enter the second antireflection film 3312, a second reflected portion of the light beams is reflected by a second interface defined between the first antireflection film 3311 and the second antireflection films 3312, and another part of the light beams is lost at the second interface. The second reflected portion of the light beams returns to the first interface, a part of the second reflected portion of the light beams is lost at the first interface, and a third reflected portion of the second reflected portion of the light beams passes out into the transparent substrate 34. The third reflected portion of the light beams is substantially parallel with the first reflected portion of the light beams, and the third and first reflected portions of the light beams substantially cancel each other out because of so-called destructive interference therebetween. Thus net reflection of the outside source light beams from the first and second interfaces back to an outside of the LCD device 300 is minimal.

In similar fashion to that described above, light beams transmitting to and through the portion of the black matrix 33 toward an interior of the LCD device 300 are partially transmitted, partially reflected and partially lost at the various interfaces defined between respective adjacent of the transparent substrate 34 and the first and second antireflection films 3311, 3312, 3321, 3322. Reflected portions of the light beams reflected by the various interfaces mostly cancel out respective previously reflected portions of the light beams reflected by respective other interfaces. Thus net reflection of the outside source light beams from the various interfaces back to the outside of the LCD device 300 is minimal.

In similar fashion to that described above in relation to outside source light beams, light beams entering the black matrix 33 from an inside of the LCD device 300 undergo reflection at the various interfaces defined by the first and second antireflection films 3311, 3312, 3321, 3322. Various reflected portions of the light beams substantially cancel each other out because of destructive interference therebetween. Thus net reflection of the internal source light beams from the various interfaces back to the inside of the LCD device 300 is minimal.

In summary, the antireflection films 3311, 3312, 3321, 3322 can greatly reduce not only the optical reflectivity of both outermost surfaces of the black matrix 33, but also the wavelength dependence of the reflectivity in the visible wavelength range. Thus the phenomenon of light interference in the LCD device 300 is greatly diminished, and the visibility of the LCD device 300 is improved.

Figure 3:
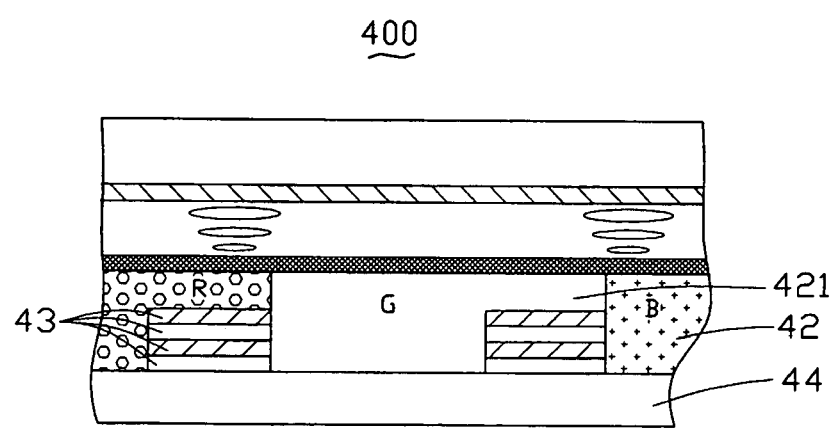
FIG. 3 is a schematic, cross-sectional view of part of a second embodiment of an LCD device according to the present invention.
Figure 4:
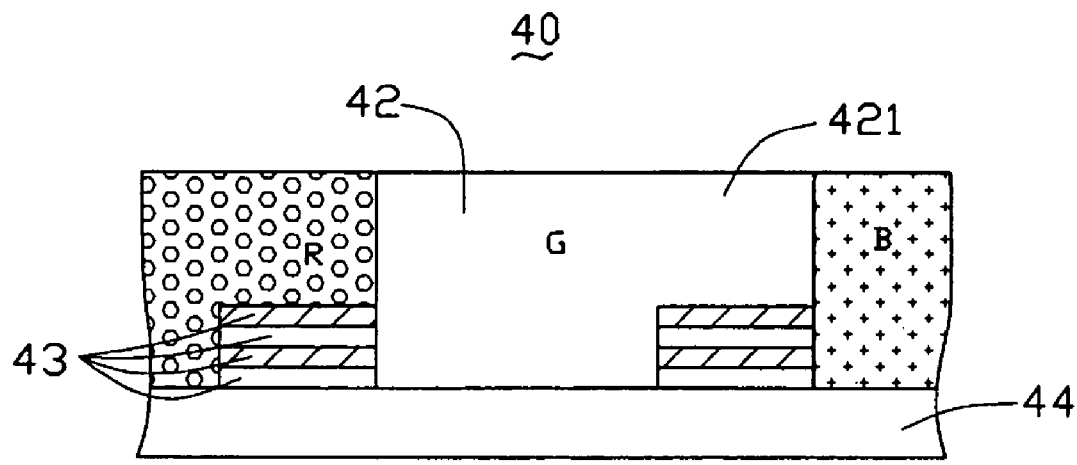
FIG. 4 is a schematic, cross-sectional view of part of a color filter in accordance with a first sub-embodiment of the LCD device of FIG. 3.

Referring to FIG. 3, an LCD device 400 according to the second embodiment of the present invention is shown. The LCD device 400 has substantially the same structure as that of the LCD device 300 of the first embodiment. Referring to FIG. 4, a color filter 40 in accordance with the first sub-embodiment of the LCD device 400 is shown. The color filter 40 has substantially the same structure as that of the color filter 30 of the LCD device 300, except that three RGB resins of a color resin layer 42 have resin parts 421 covering the black matrix 43 entirely. The RGB resins are filled in each three adjacent apertures of the black matrix 43 respectively. Each RGB resin filled in an aperture has a resin part 421 covering a corresponding adjacent part of the black matrix 43. The resin part 421 adjoins a corresponding one of the other two RGB resins that is filled in an adjacent aperture of the black matrix 43. Thus the black matrix 43 is entirely covered by a continuous, plane layer of the RGB resins. That is, the color resin layer 42 is formed over an entirety of the transparent substrate 44 and the black matrix 43. This structure can improve the OD value of the black matrix 43 and still provide low reflectivity for the color filter 40.

Figure 5:
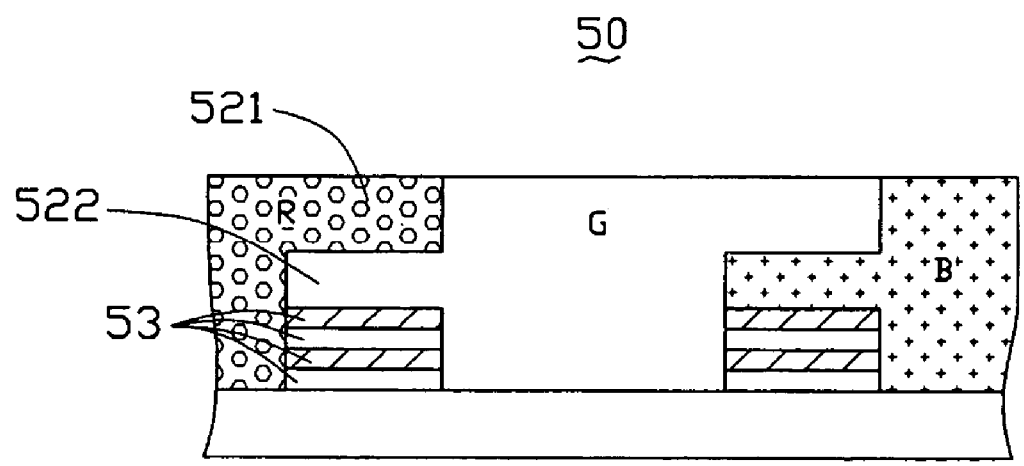
FIG. 5 is a schematic, cross-sectional view of part of a color filter in accordance with a second sub-embodiment of the LCD device of FIG. 3.

Referring to FIG. 5, a color filter 50 in accordance with the second sub-embodiment of the LCD device 400 is shown. The color filter 50 has substantially the same structure as that of the color filter 40, except that the black matrix 53 is covered by two resin parts 521, 522 of respective adjacent RGB color resins. Each two resin parts 521, 522 of respective adjacent RGB resins that cover a corresponding part of the black matrix 53 are fully lapped one on the other. Thus the black matrix 43 is entirely covered by the RGB resins. A continuous, plane RGB resin layer is formed over an entirety of the transparent substrate 44 and the black matrix 53. This structure can improve the OD value of the black matrix 53 and still provide low reflectivity for the color filter 50.

Figure 6:
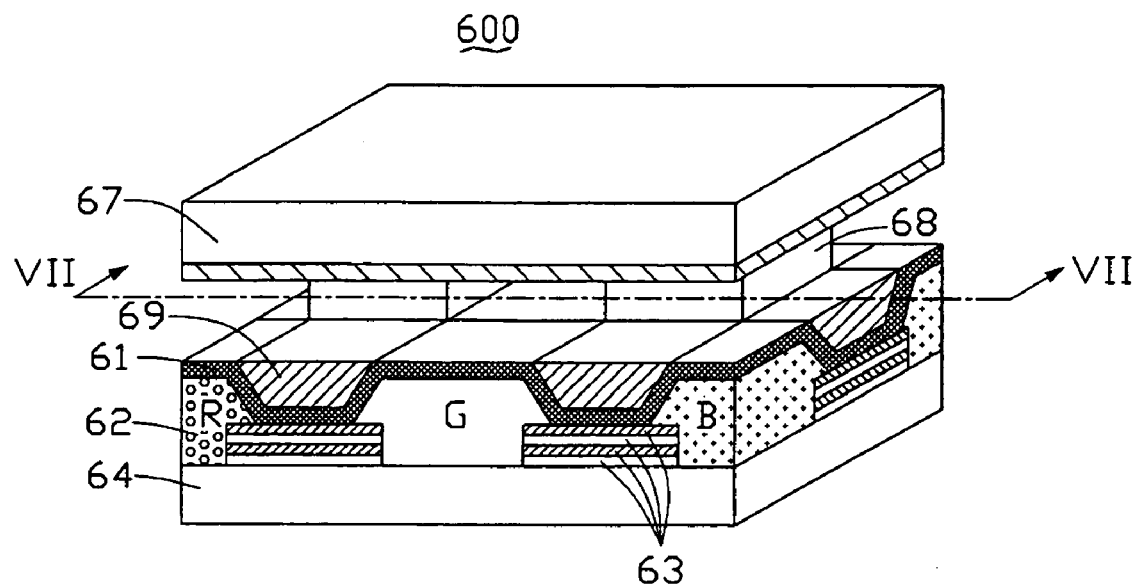
FIG. 6 is a schematic, isometric view of part of a third embodiment of an LCD device according to the present invention, but not showing a liquid crystal layer thereof.
Figure 7:
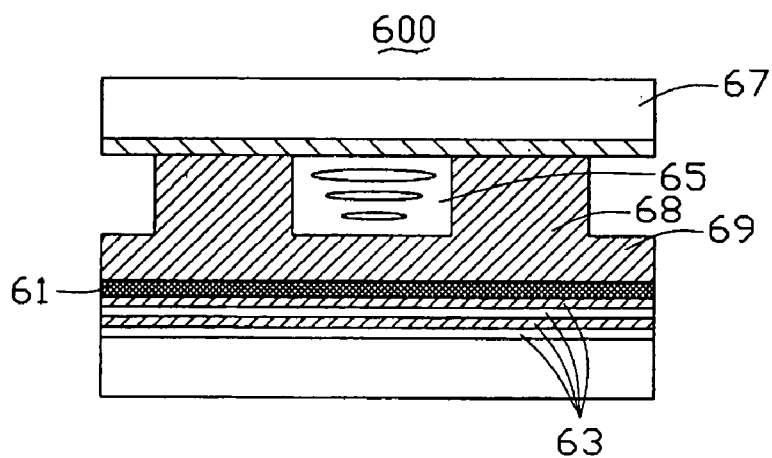
FIG. 7 is a schematic, cross-sectional view corresponding to line VII—VII of FIG. 6.
Figure 8:
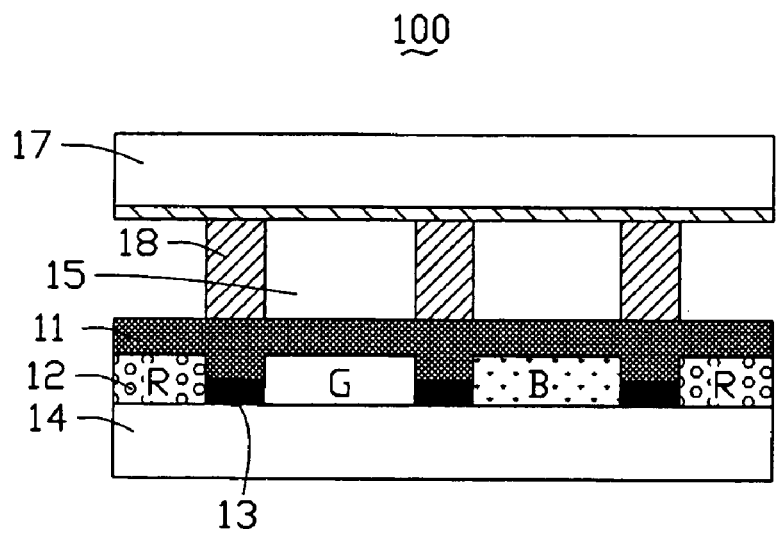
FIG. 8 is a schematic, cross-sectional view of part of an LCD device incorporating a conventional color filter therein.
Figure 9:
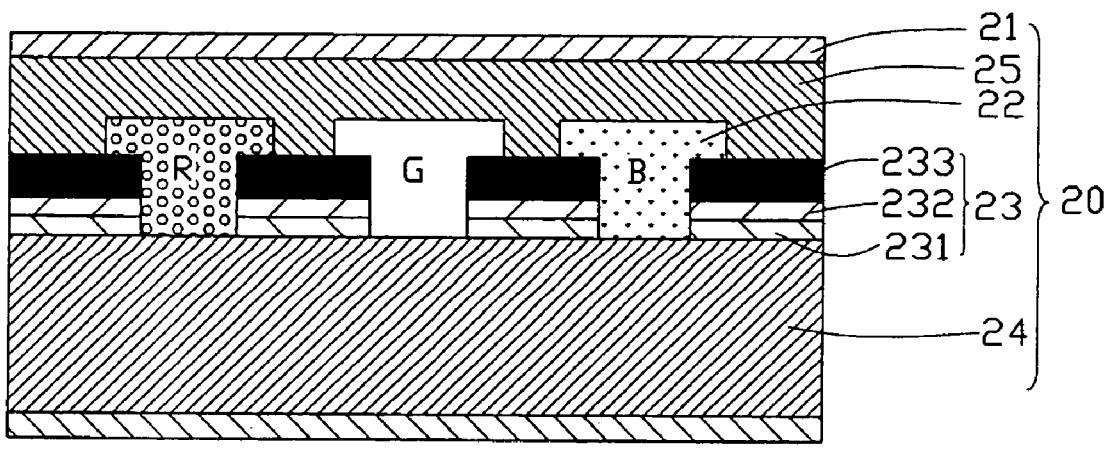
FIG. 9 is a schematic, cross-sectional view of part of another conventional color filter.

Referring to FIGS. 6 and 7, an LCD device 600 according to the third embodiment of the present invention is shown. The LCD device 600 has substantially the same structure as that of the LCD device 300 of the first embodiment, except that a color resin layer 62 extends higher than a black matrix 63. That is, a groove (not labeled) is defined between each two adjacent color resins, thereby forming a matrix of grooves over the entire black matrix 63. A uniformly thick ITO layer 61 is coated on the black matrix 63 and the color resin layer 62. An opaque or black wall matrix 69 made of photosensitive resin or thermosensitive resin is filled in the matrix of grooves and adjoins adjacent color cells. Thus a continuous, plane resin layer is formed over an entirety of the transparent substrate 64 and the black matrix 63. In addition, a plurality of generally columnar spacers 68 protrudes from the wall matrix 69 and abuts an opposing electrode substrate 67. A chamber is thereby formed between the two substrates 64, 67, and a liquid crystal layer 65 is filled in the chamber.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A liquid crystal display device comprising:
  a first substrate;
  a black matrix having a plurality of color cells on the first substrate, the black matrix comprising a first layer on the first substrate and a second layer on the first layer, the first and second layers each comprising a first antireflection film having a first refraction index, and a second antireflection film formed on the first antireflection film and having a second refraction index which is greater than the first refraction index;
  a color resin layer formed by filling color resin in the color cells, the color resin covering the black matrix entirely;
  a wall matrix formed over the black matrix, the wall matrix being made of photosensitive resin or a thermosensitive resin; and
  a second substrate opposite to the first substrate and cooperating therewith to define a chamber therebetween for receiving a liquid crystal layer.

2. The liquid crystal display device as claimed in claim 1, wherein a plurality of spacers protrude from the wall matrix and abut the second substrate.

3. The liquid crystal display device as claimed in claim 1, wherein the wall matrix is opaque.

4. The liquid crystal display device as claimed in claim 1, wherein the wall matrix is black.

5. The liquid crystal display device as claimed in claim 1, further comprising an ITO (Indium Tin Oxide) layer covering the black matrix and the color resin layer, the wall matrix being formed on the ITO layer.

6. The liquid crystal display device as claimed in claim 1, wherein the color resin layer is higher than the black matrix so as to form a matrix of grooves between adjacent color cells, the wall matrix being filled in the matrix of grooves.

* * * * *